Patented Mar. 16, 1937

2,074,225

UNITED STATES PATENT OFFICE 2,074,225

AZO DYESTUFFS AND THEIR MANUFACTURE

Adolf Krebser, Riehen, near Basel, Switzerland, assignor to the firm J. R. Geigy, A. G., Basel, Switzerland No Drawing. Application October 16, 1935, Serial No. 45,359. In Germany November 10, 1934

8 Claims. (Cl. 260—93)

This invention consists in the manufacture of valuable ortho-hydroxyazo-dyestuffs by coupling an ortho-hydroxy-diazonium compound with an N-acyl-derivative of 2-amino-6-hydroxynaphthalene-8-sulphonic acid of the general formula:

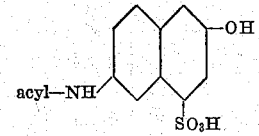

They yield beautiful dyeings which, when chromed, have remarkable properties of fastness.

2-amino-6-hydroxynaphthalene - 8 - sulphonic acid and its derivatives have not yet found technical application. The sulphonic acid can be obtained by known methods, for example by splitting off the diazo-group from the nitro-derivative of 1-diazo-2-naphthol-4-sulphonic acid and reducing the nitro-naphthol-sulphonic acid thus formed [see Ruggli, Helv. chim. acta XII, 1929, page 1034].

The following examples and tables illustrate the invention:—

Example 1

16.8 kilos of 6-nitro-4-methyl-2-aminophenol are diazotized in the usual manner and coupled in a solution, feebly alkaline with sodium carbonate, with 28.4 kilos of 2-acetylamino-6-hydroxynaphthalene-8-sulphonic acid, made by acetylating by known methods 2-amino-6-hydroxynaphthalene-8-sulphonic acid. When coupling is complete the dyestuff is filtered and dried. It is a black powder soluble in dilute acetic acid to a violet solution, in dilute sodium carbonate solution to a blue solution and is concentrated sulphuric acid to a blue-red solution. It dyes wool in an acid bath blue, which becomes, when after-chromed, a blue-grey of characteristic properties of fastness.

Example 2

22.4 kilos of 4-chloro-2-amino-phenol-6-sulphonic acid are diazotized and coupled in a solution, alkaline with sodium carbonate, of 28.4 kilos of 2-acetylamino-6-hydroxynaphthalene-8-sulphonic acid, obtained as described in Example 1. When coupling is complete the dyestuff is salted out and filtered; it is a dark powder, soluble in dilute acetic acid to a red solution, in dilute sodium carbonate solution to a violet solution and in concentrated sulphuric acid to a violet solution. It dyes wool in an acid bath red-violet which, on after-chroming, becomes blue. The fastness is very good.

If in Example 1 or 2 there is substituted 2-chloroacetylamino-6-hydroxynaphthalene-8-sulphonic acid for the 2-acetylamino-derivative, dyestuffs having similar properties are obtained.

Example 3

23.4 kilos of 4-nitro-2-aminophenol-6-sulphonic acid are diazotized as usual. The diazonium solution is added to a solution, alkaline with sodium carbonate, of 34.3 kilos of 2-benzoylamino-6-hydroxynaphthalene-8-sulphonic acid, made by benzoylating 2 - amino-6-hydroxynaphthalene-8-sulphonic acid in presence of sodium acetate by known methods. When coupling is complete the dye-stuff is filtered; it is a black powder, soluble in aqueous acetic acid to a red solution, in sodium carbonate solution to a violet solution and in concentrated sulphuric acid to a blue-red solution. It dyes wool in an acid bath blue, which on after-chroming becomes olive. The chromed dyeing has very good properties of fastness.

Example 4

14.4 kilos of 4-chloro-2-aminophenol are diazotized in the usual manner and the diazonium solution is run into one of 34.3 kilos of 2-benzoylamino-6-hydroxynaphthalene-8-sulphonic acid, obtained as described in Example 3, in 200 litres of water containing 14 kilos of anhydrous sodium carbonate and 100 litres of pyridine. When coupling is complete the separated dyestuff is filtered and dried. It is a black-violet powder, which dissolves in aqueous acetic acid to a red solution, in a solution of sodium carbonate to a blue solution and in concentrated sulphuric acid to a violet solution; it dyes wool in an acid bath red, which on after-chroming, becomes fast blue.

Example 5

15.4 kilos of 5-nitro-2-aminophenol are diazotized in the usual manner and the diazonium solution, the mineral acid in which has been buffered with sodium bicarbonate, is allowed to flow into a solution of 39.5 kilos of 2-para-toluenesulphonylamino- 6 -hydroxynaphthalene-8-sulphonic acid, (made by the action of toluene-sulphochloride on 2-amino-6-hydroxynaphthalene-8-sulphonic acid in an acid solution) in 250 litres of water containing 10 kilos of sodium bicarbonate and 100 litres of pyridine.

When coupling is complete the dyestuff is filtered; it is a black powder, soluble in aqueous acetic acid to a blue-red solution, in a sodium carbonate solution to a green-blue solution and in concentrated sulphuric acid to a blue-red solution. It dyes wool in an acid bath violet, which on after-chroming becomes greenish-grey.

| | Diazo component | Coupling component | Solution in water containing | | Solution in concentrated sulphuric acid | Dyeings on wool | |
|---|---|---|---|---|---|---|---|
| | | | Acetic acid | Sodium carbonate solution | | Acid | Chromed |
| (1) | 4-chloro-2-amino-phenol | 2-acetyl-amino-6-hydroxy-naphthalene-8-sulphonic acid. | Red. | Violet. | Violet. | Red-violet. | Blue-grey. |
| (2) | 4,6-dichloro-2-aminophenol. | ___do___ | Red. | Violet. | Blue-red. | Violet. | Grey. |
| (3) | 4-nitro-2-amino-phenol | ___do___ | Red. | Red-violet. | Blue-red. | Violet. | Olive. |
| (4) | 5-nitro-2-amino-phenol | ___do___ | Red. | Blue. | Blue-red. | Violet. | Greenish-grey. |
| (5) | Picramic acid | ___do___ | Violet. | Violet. | Blue-red. | Violet. | Olive. |
| (6) | 2-amino-phenol-4-sulphonic acid. | ___do___ | Blue-red. | Blue. | Blue-red. | Blue-red. | Blue-violet. |
| (7) | 6-methyl-2-amino-phenol-4-sulphonic acid. | ___do___ | Red. | Blue. | Blue-red. | Red. | Red-blue. |
| (8) | 4-nitro-2-amino-phenol-6-sulphonic acid. | ___do___ | Violet. | Red. | Blue-red. | Blue-grey. | Olive. |
| (9) | 6-nitro-2-amino-phenol-4-sulphonic acid. | ___do___ | Blue-red. | Blue. | Blue-red. | Blue. | Grey. |
| (10) | 4,6-dichloro-amino-phenol. | 2-benzoyl-amino-6-hydroxy-naphthalene-8-sulphonic acid. | Blue-red. | Blue. | Violet. | Blue-violet. | Blue-grey. |
| (11) | 4-nitro-2-amino-phenol | ___do___ | Yellow-red. | Violet. | Blue-red. | Violet. | Olive-grey. |
| (12) | 5-nitro-2-amino-phenol | ___do___ | Violet. | Blue. | Blue-red. | Blue. | Greenish-grey |
| (13) | 6-nitro-4-methyl-2-amino-phenol. | ___do___ | Red. | Blue. | Violet. | Blue-violet. | Blue-grey. |
| (14) | 4-methyl-2-amino-phenol-6-sulphonic acid. | ___do___ | Blue-red. | Violet. | Blue-red. | Red-violet. | Grey-blue. |
| (15) | 4-chloro-2-amino-phenol-6-sulphonic acid. | ___do___ | Blue-red. | Violet. | Violet. | Red. | Blue. |
| (16) | 6-nitro-2-amino-phenol-4-sulphonic acid. | ___do___ | Blue-red. | Blue. | Blue-red. | Blue. | Grey. |
| (17) | 4-chloro-2-amino-phenol | 2-para-toluene-sulphonylamino-6-hydroxy-naphthalene-8-sulphonic acid. | Blue-red. | Blue. | Violet. | Blue-red. | Blue-violet. |
| (18) | 6-nitro-4-methyl-2-amino-phenol. | ___do___ | Blue-red. | Blue. | Blue-red. | Violet. | Blue. |
| (19) | 4-chloro-2-amino-phenol-6-sulphonic acid. | ___do___ | Blue-red. | Blue. | Violet. | Red-violet. | Blue-grey. |
| (20) | 6-nitro-2-amino-phenol-4-sulphonic acid. | ___do___ | Blue-red. | Blue. | Blue-red. | Blue. | Grey. |

What I claim is:—

1. A process for the manufacture of ortho-hydroxyazo-dyestuffs capable of being chromed, consisting in coupling an ortho-hydroxy-diazonium compound with an N-acyl-derivative of 2-amino-6-hydroxynaphthalene-8-sulphonic acid.

2. A process for the manufacture of ortho-hydroxyazo-dyestuffs capable of being chromed, consisting in coupling an ortho-hydroxy-diazonium compound with a 2-acetylamino-6-hydroxynaphthalene-8-sulphonic acid.

3. A process for the manufacture of ortho-hydroxyazo-dyestuffs capable of being chromed, consisting in coupling an ortho-hydroxy-diazonium compound with 2-benzoylamino-6-hydroxy-naphthalene-8-sulphonic acid.

4. A process for the manufacture of ortho-hydroxyazo-dyestuffs capable of being chromed, consisting in coupling an ortho-hydroxy-diazonium compound with 2-paratoluenesulphonyl-amino-6-hydroxynaphthalene-8-sulphonic acid.

5. A process for the manufacture of ortho-hydroxyazo-dyestuffs capable of being chromed, consisting in coupling a diazotized 5-nitro-2-aminophenol with 2-benzoylamino-6-hydroxynaphthalene-8-sulphonic acid.

6. A process for the manufacture of ortho-hydroxyazo-dyestuffs capable of being chromed, consisting in coupling a diazotized 6-nitro-4-methyl-2-aminophenol with 2-acetylamino-6-hydroxynaphthalene-8-sulphonic acid.

7. A process for the manufacture of ortho-hydroxyazo-dyestuffs capable of being chromed, consisting in coupling a diazotized 5-nitro-2-aminophenol with 2-para-toluenesulphonylamino-6-hydroxynaphthalene-8-sulphonic acid.

8. Ortho-hydroxyazo-dyestuffs from an ortho-hydroxy-diazonium compound and an N-acyl-derivative of 2-amino-6-hydroxynaphthalene-8-sulphonic acid, said dyestuffs yielding dyeings which, when chromed, have remarkable properties of fastness.

ADOLF KREBSER.